Figures 1, 2:
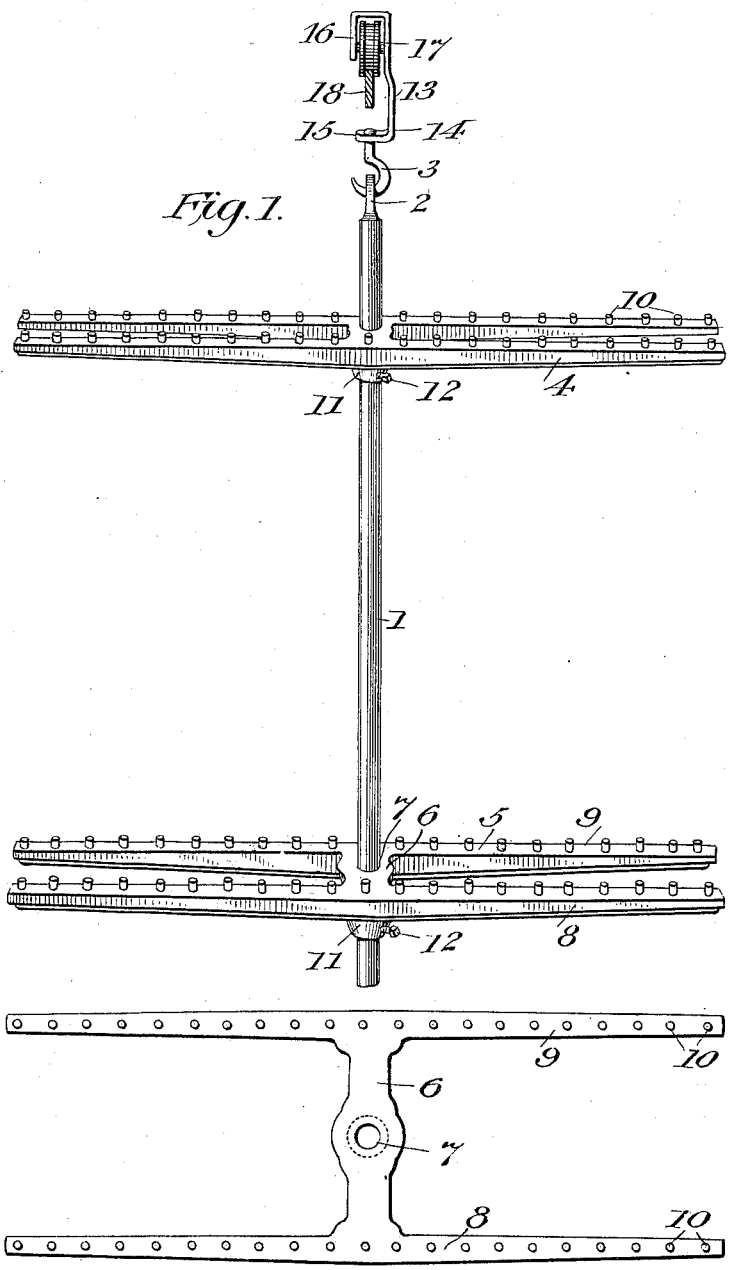

No. 688,674. Patented Dec. 10, 1901.
P. OEHMEN.
MEAT TREE.
(Application filed Mar. 15, 1900.)
(No Model.)

Witnesses: Inventor:
Geo. T. May, Jr. Peter Oehmen
H. E. Montague. By Offield Towle & Linthicum
Attys

UNITED STATES PATENT OFFICE.

PETER OEHMEN, OF CHICAGO, ILLINOIS, ASSIGNOR TO THE FITZGERALD MEAT TREE COMPANY, OF CHICAGO, ILLINOIS, A CORPORATION OF ILLINOIS.

MEAT-TREE.

SPECIFICATION forming part of Letters Patent No. 688,674, dated December 10, 1901.

Application filed March 15, 1900. Serial No. 8,836. (No model.)

*To all whom it may concern:*

Be it known that I, PETER OEHMEN, of Chicago, Illinois, have invented certain new and useful Improvements in Meat-Trees, of which the following is a specification.

This invention relates to improvements in suspendable meat-trees or devices for suspending a plurality of pieces of meat—such as hams, shoulders, and the like—from a single support or tree in such manner that while the several pieces are independently suspended in such relation as to afford free circulation of air around and through the same, yet they are nevertheless arranged to occupy the minimum amount of space consistent with securing the necessary interspaces.

The objects of the invention are to provide a simple efficient device of the character referred to, to combine therewith such supporting mechanism as will afford the most convenient access to all parts thereof and will enable the device to be transported bodily from one location to another without unloading the tree, and to render the several supporting members readily adjustable, so that the device may be adapted to various sizes or cuts of meat which may be suspended therefrom.

To the above ends the invention consists in the matters hereinafter described, and more particularly pointed out in the appended claim, and the same will be readily understood from the following description, reference being had to the accompanying drawings, in which—

Figure 1 is an isometrical perspective view of a device embodying my invention, and Fig. 2 is a top plan view of one of the cross-tree members removed from the tree.

Referring to said drawings, 1 designates a suitable tree-body or suspension-bar desirably made of uniform diameter throughout its principal length and provided at its upper end with a suitable device—as, for example, an eye 2—whereby it may be detachably engaged with a support or hook 3. Upon said main body or tree 1 are mounted a plurality of cross-trees 4 5, each in the preferred construction shown herein comprising a central cross-bar 6, centrally apertured, as indicated at 7, to receive and fit upon the tree-body 1 and provided at its outer ends with suspension-bars 8 9, arranged to extend parallel with each other and preferably at right angles to the cross-bar 6. The length of the cross-bar 6 will desirably be made such that the parallel bars 8 and 9 will be spaced apart only far enough to insure that when they are loaded with cuts of meat—as, for example, hams or shoulders—these shall hang free from or out of contact with each other, but in as close proximity as practicable without touching, so as to economize in space. The length of the parallel bars or cross-trees may be varied at will, and in order to provide means for readily attaching the several pieces of meat to these bars each is provided upon its upper surface with a row of studs 10, spaced at intervals apart throughout the length of the bar. These studs may be conveniently and are shown herein as arranged at short intervals apart, so that when used to support quite small cuts the latter may be hung at relatively frequent intervals apart, while for larger cuts only every alternate one of the supporting-studs may be used. In order to provide for vertical adjustment of these cross-trees upon the body of the tree, each cross-bar is conveniently provided with an integral extension or hub 11, arranged concentrically with the aperture therein at the lower side thereof, and through one side of this hub is tapped a set-screw 12, which may be set up against the tree to lock the cross-tree in any desired position of vertical adjustment.

In the practical use of a tree of the character referred to it frequently becomes necessary to transport the meat from one place to another—as, for example, from one part of a store-room to another or from a store-room to a car, or vice versa—and it therefore becomes important to provide means whereby the tree may be transported bodily without unloading the same. To this end the supporting-hook 3, from which the tree is suspended, is mounted upon a carriage 13, desirably and as herein shown consisting of a strap-metal hanger 14, provided at its lower end with a right-angled or horizontal portion 15, with which the supporting-hook 3 has swiveling engagement, and at its upper end with an open loop or returned portion 16, within which is mounted a grooved track-roller 17, adapted to roll upon an ordinary track-rail 18. It will of course be understood that the rail 18 will be supported and arranged to extend from place to place wherever it may be desired to transport the loaded tree.

The operation of my device will be fully understood from the foregoing description; but it may be noted that the specific construction shown possesses certain important advantages, which may be briefly stated as follows: By reason of the parallel arrangement of the bars of the cross-trees, causing each tree to form as a unit or whole when loaded an approximately rectangular or cubical body of meat with interspaces between each piece, a plurality of these trees may be suspended side by side or end to end, and thus arranged to occupy a minimum amount of space. By reason of the swiveled arrangement by which the tree is supported it is obviously made more convenient to obtain access to the several arms of the tree in loading or unloading the same or in adjusting the tree to pass obstructions in railing it from place to place, while the provision of the traveling support and the means for adjusting the several cross-trees upon the tree-body are obviously important features.

While I have herein shown a specific form of support mounted upon the tree proper, yet I do not wish to be understood as limiting the invention to this specific construction, since it is obvious that the tree may be provided with suspending devices or meat-supports of different construction from those shown herein without substantially departing from the invention.

I claim as my invention—

In a meat-tree, the combination of a suspendable tree body or bar, made of uniform size throughout its principal length, and provided at its upper end with means for detachably engaging a support, and a plurality of cross-trees or meat-supports mounted upon said tree-body, each comprising a cross-bar having sliding engagement with the tree-body, and provided at its opposite ends with supporting-bars arranged parallel with each other, a row or series of projections upon each supporting-bar, and means for securing said cross-trees in adjusted position upon the meat-tree body, substantially as described.

PETER OEHMEN.

Witnesses:
ALBERT H. GRAVES,
FREDERICK C. GOODWIN.